United States Patent [19]

Cannady, Jr. et al.

[11] 4,256,793
[45] Mar. 17, 1981

[54] EMBOSSING ASSEMBLY FOR HIGH PRESSURE LAMINATE SURFACES

[75] Inventors: Daniel L. Cannady, Jr., Allendale, S.C.; Salvatore E. Palazzolo, Elizabeth City, N.C.

[73] Assignee: Westinghouse Electric Corp., Pittsburgh, Pa.

[21] Appl. No.: 552,831

[22] Filed: Feb. 25, 1975

[51] Int. Cl.³ .............................................. B32B 3/10
[52] U.S. Cl. ................................. 428/137; 156/219; 264/220; 264/331; 428/156; 428/161; 428/172; 428/213; 428/246; 428/255; 428/256; 428/284; 428/290; 428/332
[58] Field of Search ............... 156/219, 220, 221, 222; 428/137, 164, 172, 156, 256, 239, 238, 161, 246, 255, 332, 284, 213, 290; 264/220, 243, 331

[56] References Cited

U.S. PATENT DOCUMENTS

| | | | |
|---|---|---|---|
| 2,861,372 | 11/1958 | Hunt | 264/220 |
| 3,454,457 | 7/1969 | Hale et al. | 156/219 |
| 3,700,537 | 10/1972 | Scher | 428/138 |
| 3,819,465 | 6/1974 | Parsons et al. | 156/84 |

Primary Examiner—George F. Lesmes
Assistant Examiner—E. Rollins Buffalow
Attorney, Agent, or Firm—D. P. Cillo

[57] ABSTRACT

A heat and pressure consolidated embossing assembly, for use in making decorative laminates, consists of an embossing sheet, having a thickness of between about 0.025 inch to 0.250 inch, disposed between two fibrous exterior layers impregnated with a resinous material, where the thickness ratio of each fibrous exterior layer:embossing sheet is from about 1:2.5 to 1:12.

2 Claims, 3 Drawing Figures

EMBOSSING ASSEMBLY FOR HIGH PRESSURE LAMINATE SURFACES

BACKGROUND OF THE INVENTION

Decorative laminates are well known articles of commerce which have been produced for many years, finding extensive use as table tops and wall surfaces. Normally, the surface has a high gloss or satin finish. In some cases, however, it is desirable to have a semi-dull, rough or embossed finish.

To impart this rough or embossed finish to a laminate surface by means of an embossed pressing plate would be very expensive. Embossed finishes have been impressed by using a perforated stencil or solid embossed metal sheet, as an embossing sheet in a laminate assembly, as taught by Grosheim in U.S. Pat. No. 3,418,189 and Olsen in U.S. Pat. No. 2,070,023. This type of embossing sheet, however, has a tendency to rupture the protective overlay and print sheets in the laminate assembly, ruining the finish, and allowing resin from the core of the laminate assembly to bleed through to the laminate surface.

Hunt, in U.S. Pat. No. 2,861,372, recognized these problems. He used a wire screen sandwiched between two aluminum foils as a texturing sheet assembly, in a thermoplastic resin impregnated laminate stack up, using pressures of about 200 psi for laminate bonding. This provided a soft, lightly textured effect on the laminate surface, the aluminum absorbing most of the texturing effect from the screen. Hunt stitched, stapled or roll pressed the aluminum foil edges to seal in the screen. He required that the texturing assembly be of larger area than the laminate stack up, so that the seal would not mar the laminate finish.

Such an embossing assembly produces problems on a modern production line, where Hunt's sealing procedure would be difficult to use with large laminates, and where all elements in the laminate stack up are generally required to be the same area size. Also, for bonding of thermoset resin impregnated laminates, where pressures of 800 psi to 1500 psi are required, the wire screen would generally cut through the exterior aluminum foil sheets, unless the foil was very thick with resultant poor texturing effect. Such use of aluminum foil also tends to produce soft texturing rather than the sharp embossing or patterning which is highly desirable.

What is needed then, is a commercially useful type embossing assembly, that will impart a sharp embossing or other type decoration to thermoset high pressure laminates without cutting or otherwise marring the laminate surface.

SUMMARY OF THE INVENTION

The above need is met by providing a patterned embossing assembly, consisting of a patterned solid or open patterned metallic or non-metallic embossing sheet disposed between two exterior resin impregnated fibrous layers. The patterned embossing sheet could be selected from patterned metallic or non-metallic solid sheet, perforated metallic or non-metallic sheet, wire mesh sheet, wire cloth, or resilient high temperature resistant non-metallic weaving. The fibrous exterior layers, could be made from a plurality of sheets of paper, or cloth, impregnated with a thermoset or high temperature thermoplastic resinous material.

The patterned embossing sheet is placed between two resin impregnated fibrous exterior layers, and the assembly is heat and pressure consolidated to provide a three ply construction. The thickness ratio of each fibrous exterior layer: embossing sheet must be in the range of about 1:2.5 to 1:12. The thickness of the patterned embossing sheet is between about 0.025 inch to 0.250 inch.

The method of fabricating the embossing assembly is simple and provides smooth edges allowing the embossing assembly to be the same area as the other elements in the laminate stack up. In making a laminate, the encapsulated patterned embossing sheet presses against the flexible resinous exterior sheets without rupture of the exterior sheets, during 800 psi to 1500 psi laminate molding, and yet transfers the desired pattern to provide very sharp, deep embossing or other type decoration of the laminate assembly surface.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
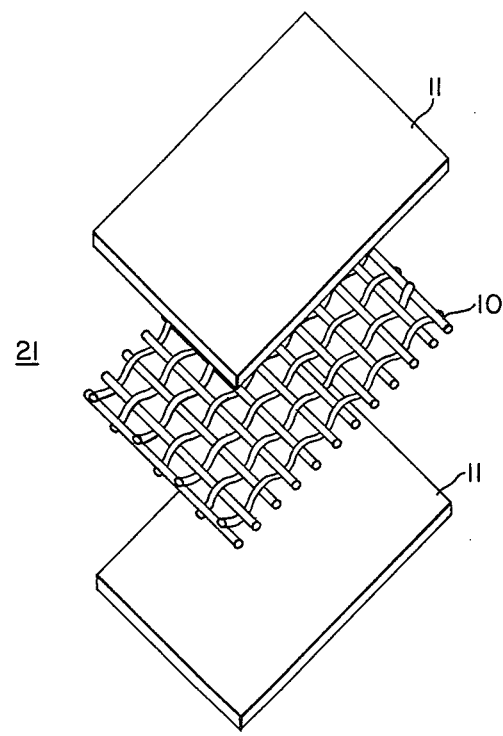
FIG. 1 shows the three ply construction of one type of the embossing assembly of this invention.

Referring now to FIG. 1, the sandwich construction of the embossing assembly of this invention is shown. The embossing sheet 10 can be a patterned solid metal or non-metallic sheet or an open patterned metallic or non-metallic sheet selected from wire mesh sheet, perforated or punched metal sheet, wire cloth i.e. wire screen or resilient non-metallic high temperature resistant weaving. Examples of suitable non-metallic materials are resilient high temperature materials such as polyimide, polytetrafluoroethylene or graphite.

The embossing sheet must be able to resist high temperature and pressure molding cycles, about 145° C. to 175° C. and 800 psi to 1500 psi, without substantial deformation. The embossing sheet thickness, including any raised pattern or protrusion or pressed indentations in the solid embossing sheet can range from about 0.025 inch to 0.250 inch (0.06 cm to 0.62 cm) with a preferred thickness of between 0.03 inch and 0.125 inch i.e. 1/32" to ⅛". A thickness less than about 0.025 inch will not provide sufficient definition through the exterior sheets during molding to produce a deep patterned finish to the laminate surface after molding. A thickness over about 0.25 inch would generally require an excessive amount of exterior sheet to prevent cut through and laminate surface marring during molding; also, such thick embossing sheets would require a substantial amount of extra time to heat before the proper molding temperature is reached, adding to production time and cost.

Figure 3:
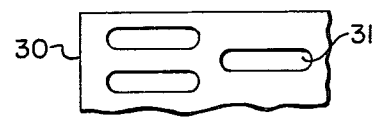
FIG. 3 shows one type of a perforated metal pattern that can be used in the embossing assembly of this invention.

The holes in the open patterned wire cloth or weaving must be between about 100 mesh to 6 mesh i.e. between about 0.006 inch to 0.131 inch diameter (0.015 cm to 0.33 cm). Below 0.006 inch, there will be little definition through the exterior sheets and above 0.131 inch, there will be little coherence in the weaving. In the case where wire mesh or perforated embossing sheet is used, the area of each opening on the sheet can be between about 0.004 sq. inch to 9 sq. inches i.e. if for example a sheet with square perforations through it is used, the length of the perforations could range from 1/16 inch to 3 inches on each side (providing areas of from 1/256 square inch to 9 square inches). A typical punched out pattern is shown in FIGS. 3, where the sheet 30 forming the embossing sheet can have circular, oblong or other type regular or staggered openings 31 to provide a pattern. In the case where a patterned solid embossing sheet is used, the area of each raised pattern or protrusion or pressed indentation in the solid sheet can be between about 0.004 sq. inch to 9 sq. inches. Below 0.004 sq. inch in these latter two cases, there will be little definition through the exterior sheet during molding.

The embossing sheet must be capable of resisting deformation at operating pressures. This presents little problem for metal sheets or metal cloth, but requires careful selection for non-metal sheets, fabric and fibers. The non-metal sheets must not melt or flow substantially, must be able to spring back into shape after molding, and must be hard enough to provide sufficient definition through the exterior sheets to transfer an embossed or deep patterned finish to the laminate surface after molding. The non-metal embossing sheets, fabric and fibers will generally be used in the thickness range of about 0.060 inch to 0.250 inch.

The embossing sheet 10 is disposed between two exterior resin impregnated fibrous layers 11. The fibrous exterior layers can consist of a plurality of sheets selected from a cellulosic material such as kraft paper, sulfite kraft paper, alpha cellulose paper or other materials such as cotton linter paper, rag paper, asbestos paper, cotton cloth, glass cloth or linen cloth. These sheets must be stretchable, flexible, and must be able to resist the 145° C. to 175° C. temperatures usually employed in high pressure molding operations.

The thickness ratio of each fibrous exterior layer embossing sheet must be in the range of about 1:2.5 to 1:12 i.e. if each of the fiber layers for example is 10 mils thick, the sandwiched metal screen can range in thickness from 25 mils to 120 mils. Generally both fiber layers will be the same thickness. When the embossing sheet is thicker than 12 times the thickness of an exterior fiber layer, it can very easily cut through that exterior layer of the embossing assembly and mar the laminate surface during molding by cutting through the overlay and print sheets i.e. if one fiber layer is 10 mils thick and the other fiber layer is 20 mils thick and the sandwiched metal screen is 170 mils thick, during high pressure molding the screen will cut through the 10 mil thick fiber layer. When the embossing sheet is thinner than 2.5 times the thickness of an exterior fiber layer, it will not provide sufficient definition through that exterior layer of the embossing assembly to produce an embossed or deep patterned finish to the laminate surface after molding.

The exterior fibrous sheets are impregnated with a thermoset resin such as phenolic resin, epoxy resin, polyester resin, an aminoplastic resin such as melamine-formaldehyde resin or a high temperature thermoplastic resin such as amide-imide, imide or aromatic polysulfone resin. The exterior fibrous sheets are treated to a resin ratio of between about 1.5 to 2.0 i.e. the impregnated exterior sheet material carries resin in an amount equal to from about 50% to 100% of the sheet material weight alone. Resin inclusion over this ratio would result in possible loss of definition in the molded embossing sheet. A resin ratio less than 1.50 would not provide a sufficient resin buffer between the embossing sheet and the laminate assembly surface, and could result in cut through and marring.

It is the combination of exterior fibrous layer flexibility, the ratio of exterior layer to embossing sheet thickness, and resin content within the exterior layer of the embossing assembly, that provides a useful and effective embossing assembly providing good definition through the exterior sheets without cut-through during high pressure molding. Unlike metal foil, the impregnated fibrous sheets, even when set, have sufficient give and flexibility to act as a buffer for the embossing sheet, yet sufficient hardness to provide an embossed or deep patterned finish for the laminate surface.

The exterior fibrous layer 11 can have an effective amount of a coating of a suitable release agent thereon. These release agents are well known in the art and can comprise, for example, polytetrafluoroethylene, stearic acid, zinc stearate or calcium stearate.

In making the embossing assembly of this invention, the patterned embossing sheet is placed between two exterior layers, preferably a plurality of epoxy resin impregnated kraft paper sheets. The assembly of three components is then heat and pressure consolidated in a suitable press for a time, and at a temperature and pressure effective to cure the resin and consolidate the assembly, usually between about 145° C. to 175° C. and about 800 psi to 1500 psi for 5 minutes to 90 minutes.

Figure 2:
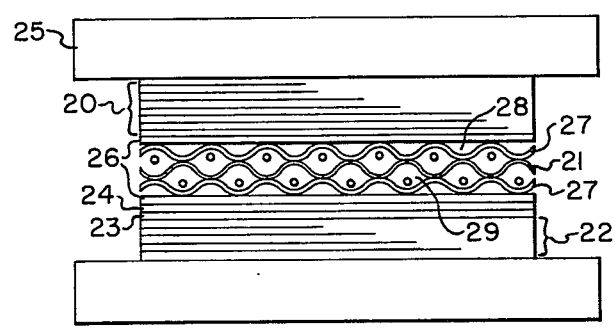
FIG. 2 shows the embossing assembly of this invention in a high pressure laminating assembly or stack up.

Referring now to FIG. 2 of the drawings, a typical laminate stack up 20 is shown with the embossing assembly of this invention shown as 21.

In the general manufacture of decorative laminates, it is conventional to prepare a stack up in superimposed relationship of a plurality of core sheets 22, a decorative sheet 23 positioned immediately above the core sheets and a protective overlay sheet 24. In the method of this invention, an embossing assembly 21 is positioned between the overlay sheets, whereupon heat and pressure are applied by press plates 25 in a press, to consolidate the stack ups to a unitary structure, after which the embossing assembly is removed.

Also shown are release sheets 26 which may be made of 0.0005 inch to 0.005 inch thick metal sheet such as aluminum, used alone or with a 0.001 inch to 0.005 inch supporting paper backing. Use of these sheets improves release of the embossing assembly 21 from the laminate stack up 20 after molding, especially if no release agent is used on the exterior surfaces of the embossing assembly.

The overlay sheet 24 is a thin sheet of paper which has been impregnated with a thermosetting resin, such as a melamine-formaldehyde resin or other triazine resins, urea-formaldehyde resins, thiourea-formaldehyde resins, unsaturated polyester resins and the like. In selecting the resin for the overlay sheet, it is generally preferred to utilize the same resin or substantially the same quality of resin which has been used to impregnate the print sheet. The overlay sheet is not a necessary part of the laminating assembly although it is generally used.

The print sheet 23 usually provides the decorative effect for the laminate. It is usually in the form of a decorative sheet, i.e., dyed or pigmented to impart a solid color, or printed with an ornamental design, such as wood or marble grain. It usually comprises a single sheet of absorbent alpha-cellulose or regenerated cellulose paper, impregnated with a substantially completely cured aminotriazine-aldehyde resin, usually a thermoset melamine-formaldehyde resin. Other useful print sheet materials are kraft paper, synthetic fiber paper, cotton, linen, glass fiber fabrics and the like. The rigidity-imparting core stock layer 22 usually comprises a plurality of sheets of kraft paper impregnated with phenolic resin.

The overlay, print sheet and core sheets are impregnated using standard techniques. The print sheet will be impregnated with a solution of aminotriazine-aldehyde resin to give a resin content between about 30 and 75 percent by weight, based on the total dry weight of the impregnated sheet and then dried to a stage where the volatile content is between about 2 and 10 percent. The core layer sheets are impregnated with a solution of phenolic resin to give a resin content of between about 20 and 40 percent by weight, based on the total dry weight of the impregnated sheet, and then dried to a stage at which the resin is only partly cured and has a volatile content of between 4 and 15 percent.

High pressure laminating techniques are employed in preparing the laminates from the above described assembly of core stock layer of core sheets, print sheet and overlay sheet.

Temperatures ranging from about 145° C. to about 175° C. and pressures ranging from about 800 psi to 1500 psi are employed. The time required, at these temperatures, to effect a cure of the resinous components of the assembly will usually be from about 5 minutes to about 90 minutes. The resulting laminate is generally allowed to cool to about 38° C. before being removed from the press.

In FIG. 2, the embossing assembly 21 has solid exterior layer 27, shown conforming to the surface and openings of the mesh pattern of a wire cloth embossing sheet, to provide a rough mesh configuration exterior surface. This results in a solid exterior rough surface having large numbers of indentations or spaces 28 between the embossing assembly and the top of the laminate stack up. In between the spaces, the embossing assembly has protrusions conforming to the wire which contacts the top of the laminate stack up. Upon application of pressure and heat these contact points will impart a deep patterned mesh finish to the laminate surface. Thermoset resin impregnates the exterior surface of the embossing assembly and the interior of the wire cloth at point 29. In the case where a perforated sheet is used as the embossing sheet, the exterior resin impregnated fibrous layers of the embossing assembly bond to the metal and to each other through the openings, softening the rough edges of the holes. Where a solid patterned sheet is used, the exterior resin impregnated fibrous layers of the embossing assembly bond to the raised patterns or protrusions and conform to the indentation, softening the rough edges of the pattern.

EXAMPLE 1

An embossing assembly was first prepared. A 12×18 inch sheet of 14 mesh (0.046 inch diameter openings) steel wire screen, used as an embossing sheet, was placed between two layers of 12×18 inch epoxy resin impregnated kraft paper sheets. The thickness of the wire screen was about 1/16 inch, (0.06 inch) thick. Each layer of kraft paper consisted of 3 sheets of 0.007 inch thick paper. The three sheets will mold out to approximately 0.02 inch thickness. The thickness ratio of each fibrous exterior layer: embossing sheet was 1:3 i.e. a 0.02 to 0.06 fiber to wire ratio. The resin ratio in the impregnated paper sheets was about 1.75. The three component assembly was placed in a press and molded at 1000 psi and 150° C. for about 30 minutes to consolidate, bond and cure the assembly. The embossing assembly was then taken from the press. It has a roughened deep patterned outer paper layer with clear protrusions and indentation conforming to the encapsulated wire screen. The wire screen did not cut through the paper exterior layers.

A roll of kraft paper having a basis weight of 105 pounds per 3000 sq. feet was treated with a solution of phenol-formaldehyde resin to give a resin content between 30 and 40 percent. It was then dried to a stage at which the resin was only partly cured and had a volatile content between 6 and 9 percent. Equal size impregnated core sheets, 12×18 inch, were cut from the roll and assembled in a stack of seven sheets to form a core stock layer.

A layer comprising a 12×18 inch sheet of alphacellulose paper was impregnated with melamine-formaldehyde resin and superimposed on the stack as a print sheet, followed by a melamine-formaldehyde impregnated clear overlay sheet, to form a laminate stack up. The melamine-formaldehyde resin content of the print sheet prior to drying was between 35 and 45 percent and after curing, it had a volatile content between 3.5 and 5.0 percent. An aluminum-coated paper caul stock release sheet was placed on top of the stack up. Then the embossing assembly was placed on top of the release sheet.

Another laminate stack up was made similar to that described above with the release sheet and then the overlay sheet placed on top of and next to the embossing assembly, as shown in FIG. 2.

The entire assembly, with embossing assembly sandwiched between two laminate stack ups, was then placed in a press and molded against steel pressing plates at 1000 psi and 157° C. The maximum internal temperature was about 145° C. The assembly was heated in the press for a total of about 35 minutes. About 20 minutes was required for warm up after placing the laminate in the press. The laminates were taken from the press and the release sheet and embossing assembly were easily removed. Laminates were produced having the desired deep patterned finish without any cut through or resin bleeding. The embossing assembly did not deform. The indentations in the laminates were correspondingly as deep as the protrusions in the exterior of the embossing assembly. Similar excellent results have been achieved using 14 screen steel wire mesh having a thickness of about 0.155 inch, as well as perforated metal sheet 0.031 inch thick having oblong perforations of about 0.12 sq. inch each, such as shown in FIG. 3 of the drawings. A solid metal sheet having a total thickness of 0.125 inch with about 0.12 sq. inch raised patterns constituting about one half of the total thickness, provided equally good results. In all these cases the thickness ratio of each fibrous exterior layer: embossing sheet was about 1:3.

EXAMPLE 2

As a comparative example, an embossing assembly was made from a 12×18 inch sheet of 14 mesh steel wire screen and two layers of aluminum-coated release paper. The thickness of the wire mesh was about 1/16 inch (0.06 inch). Each aluminum-coated paper sheet was about 0.004 inch thick. The aluminum layer was 0.0005 inch thick supported by 40 pound basis weight paper 0.0035 inch thick. The three components were placed together and used as a sandwiched embossing assembly in a laminate stack up similar to that described in EXAMPLE 1, except that no separate release sheet was used, the aluminum outer coating on the paper coating as a release. The fiber to wire ratio in the embossing assembly was 1:17 i.e. 0.0035 to 0.06. The same laminating temperatures, pressures and times were used as in EXAMPLE 1.

The laminates were taken from the press and the embossing assembly was easily removed. The laminates in this case had a marred finish and some breakthrough to the core sheet layer. The exterior foil sheets in the embossing assembly showed cut-through of the wire screen.

We claim:

1. An embossing assembly for use in making high pressure decorative laminates consisting of an open patterned embossing sheet able to resist temperatures of up to 175° C. and pressures of up to 1500 psi without substantial deformation, said embossing sheet having a patterned thickness of between about 0.025 inch to 0.250 inch, and being disposed between two exterior fibrous layers which comprise at least one sheet of fibrous material selected from the group consisting of kraft paper, sulfite kraft paper, alpha-cellulose paper, cotton linter paper, rag paper, asbestos paper, cotton, glass cloth and linen cloth, said fibrous layers being impregnated with a resinous material which also impregnates the interior of the open patterned embossing sheet, said resinous material being selected from the group consisting of phenolic resin, epoxy resin, polyester resin, aminoplastic resin, amide-imide resin, imide resin and aromatic polysulfone resin, wherein the resin ratio in the exterior fibrous layers is between about 1.5 to 2.0 and the thickness ratio of each exterior fibrous layer: embossing sheet is from about 1:2.5 to 1:12, said assembly being heat and pressure consolidated into a unitary bonded structure having smooth edges, and two solid, flexible, exterior fibrous surface layers with protrusions and indentations sharply and deeply conforming to the patterned, 0.025 inch to 0.250 inch surface and openings of the embossing sheet pattern; said assembly having the property, during making a laminate, of being able to resist pressures of up to 1500 psi without rupture of the exterior impregnated fibrous layers and of transferring the pattern to provide a sharp, deep embossing after separation from the laminate.

2. The embossing assembly of claim 1 wherein the embossing sheet is an open patterned sheet selected from the group of materials consisting of wire mesh sheet, perforated metal sheet, wire cloth, polyimide weaving, polytetrafluorethylene weaving and graphite fiber weaving, and both fibrous layers are the same thickness.

* * * * *